Aug. 9, 1938.   W. C. OCKER ET AL   2,125,948
HINGED PROPELLER BLADE
Filed Oct. 20, 1937
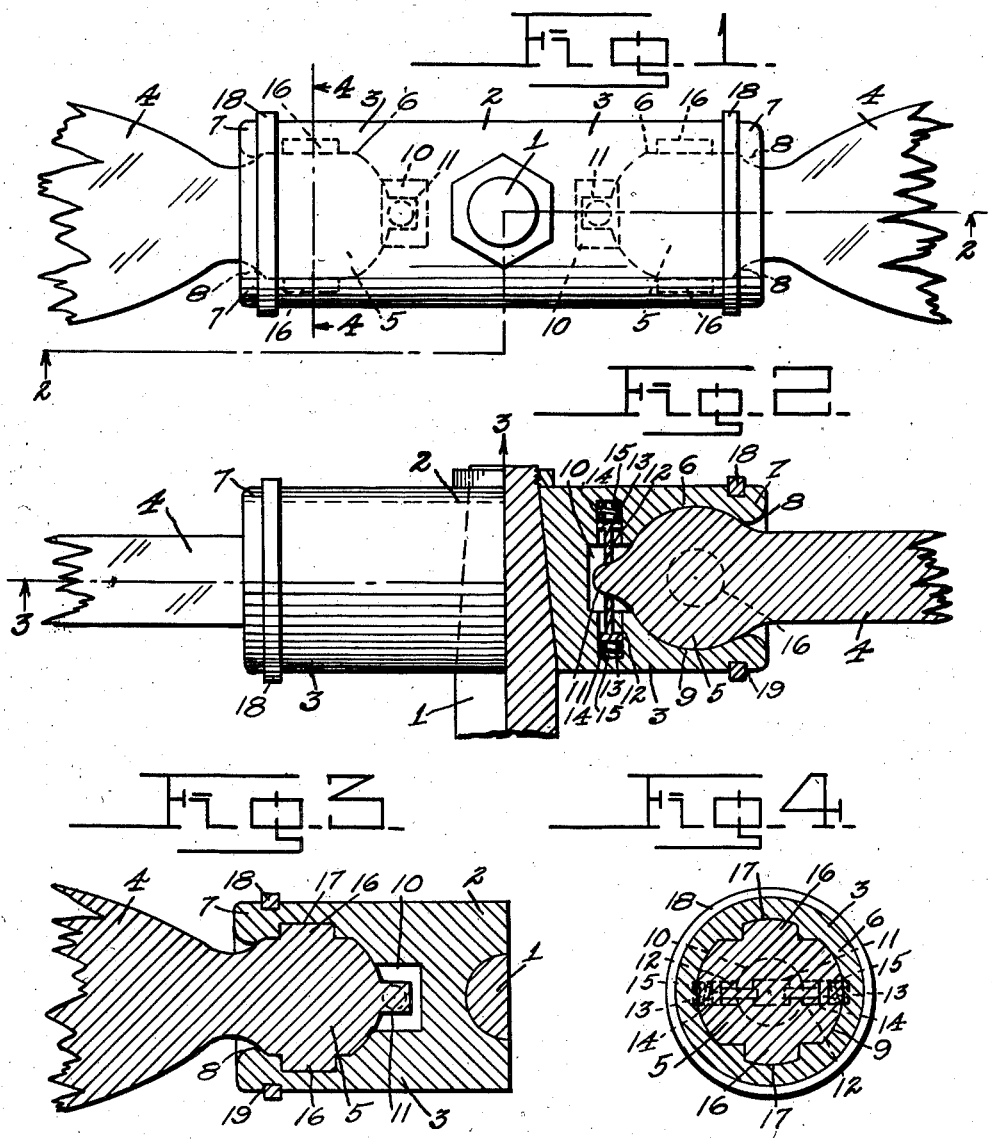
INVENTORS
William C. Ocker
George R. Smit'
BY
Adam Richmond
ATTORNEY Patented Aug. 9, 1938

2,125,948

UNITED STATES PATENT OFFICE 2,125,948

HINGED PROPELLER BLADE

William C. Ocker and George R. Smith, Brooks Field, Tex.

Application October 20, 1937, Serial No. 169,938

1 Claim. (Cl. 170—164)

(Granted under the act of March 3, 1883, as amended April 30, 1928; 370 O. G. 757)

This invention described herein may be manufactured and used by or for the Government for governmental purposes, without the payment to us of any royalty thereon.

This invention relates to airplanes, more particularly it is directed to a propeller for the airplanes.

One of the objects of the invention is to provide an improved propeller, wherein cross-sectional and gyrostatic stresses in the blades of the propeller, normally caused by the variation of the line of flight of the airplane and by thrust and drift forces, will be substantially decreased.

Another object of the invention is to provide a simplified efficient and durable propeller for airplanes, whereby the blades of the propeller are so pivoted to a hub of the propeller that the center of gravity of the blades is forward of their pivoted axis thereby effecting a balance between the movement of the blades about the axis due to centrifugal force and that due to thrust.

Another object of the invention is to provide a propeller in which each of the blades of the propeller is pivoted directly to a hub of the propeller in such a manner as to swing independently about an axis perpendicular to the axis of the thrust and to the longitudinal axis of the blades and also to provide means for reducing the frequency and amplitude of the movement of the blades about their axis.

With the above and other objects and advantages in view the invention consists in certain features of construction and operation of parts which will hereinafter appear.

For purposes of illustration the invention will be described and claimed with reference to the accompanying drawing in which like numbers distinguish like parts and in which:

Fig. 1 shows a plan view of the improved airplane propeller;

Fig. 2 is a side view of the propeller, taken on the line 2—2 of Fig. 1, one half of the propeller being in section;

Fig. 3 is a longitudinal sectional view taken on the line 3—3 of Fig. 2, and

Fig. 4 is a cross-sectional view taken on the line 4—4 of Fig. 1.

In the illustrated embodiment characterizing the invention, the drive shaft 1 of the airplane is provided with a hub 2, which carries a plurality of laterally extending arms 3, corresponding in number to the number of blades 4 of the propeller. The base of each of the blades 4 is provided with a ball portion 5, which is supported in a socket bearing or housing 6, formed in each of the arms 3, thereby providing a flexible ball and socket joint for the blades. The outer end of the socket bearings 6 are provided with an enlarged portion 7 which acts as a retaining ring to hold the ball portion 5 of the blades within the socket, the said enlarged portion 7 being rounded at the inner peripheral edge 8 thereof for limiting the movement of the blades, about a pivoted axis. The socket bearings 6 are provided with a concave portion 9, and a centrally disposed well or bore 10. The ball portion 5 of the blades is provided with a longitudinal rearwardly extending portion 11 which projects into the well or bore 10 in an opposite direction from the blades. The extension 11 is provided with a cam surface on opposite sides thereof for engagement with a plurality of radially extending piston rods or plungers 12, having heads 13 provided thereon. The inner ends of the plungers 12 are adapted to contact with the cam surfaces of the extension 11, and the heads 13 of the plungers are adapted to reciprocate within transverse and aligned tubular sockets 14. Spiral restoring springs 15 are provided between the heads 13 of the plungers 12 and within the inner ends of the tubular sockets 14, said springs being under a slight compression in their normal condition which keep the plungers in constant contact with the opposite sides of the extension 11 thereby maintaining the blades 4 in extended position when in an inoperative state.

The ball portions 5 of the blades 4 are provided with lateral trunnions 16 which extend outwardly therefrom on diametrically opposite sides thereof and pivotally engaged in radially extending bearing openings 17, which are formed within the arms 3 of the hub, perpendicular to the axis of thrust and to the longitudinal axis of the blades, whereby the blades are pivotally held to the arms 3 of the hub and are swingable about their pivoted axis toward and away from the direction of flight of the airplane, the said trunnions being at right angles to the plungers 12 which engage the opposite sides of extension portion 11 of the ball portion 5. The plungers 12 are caused to impinge on the ball joint extension 11, by the springs 15, thus reducing the frequency and amplitude of the movement of the blades about their pivoted axis by yieldably dampening and resisting the said movement. In order to secure the arms to the ball portion 5 of the blades 4, rings 18 are provided which fit within annular grooves 19, formed in the outer surface of the arms 3, adjacent to the outer ends thereof.

When the propeller is in operation, the centrifugal force tends very strongly to maintain the blades 4 revolving in a plane which is right angular to the direction of flight, while on the other hand the thrust tends to swing the blades in a direction which is similar to the direction of flight, and the consequence thereof is that each of the blades becomes disposed angularly along a direction which coincides with the resultant of the centrifugal and thrust forces.

The effect of the independent flexible or pivoted connection of each of the blades 4 with the hub 2, wherein each blade seeks independently its own plan of revolution during operation of the propeller, is to minimize the lateral cross-sectional stress at every part of the blade, particularly at its base portion, thus eliminating bending movement at the base of the blades, vibration is considerably reduced and the probability of failure of any part of the airplane due to fatigue resulting from the transmission of this vibration will be proportionally reduced. Reduction in maximum stresses will make possible the reduction in thickness of the blade to such an extent as to enable casting or forging the entire blade of metal having a high tensile strength and thus rendering the propeller practically indestructible under all conditions, also small errors in track will be automatically compensated for, thrust will be equalized and noise will be diminished.

It will thus be seen that a highly novel and useful form of propeller is provided which is well adapted for all the purposes indicated. Even though there is herein described certain features of construction and operation of parts, it is nevertheless to be understood that various changes maye be made therein without departing from the spirit or scope of the invention.

Having described our invention, what we claim as new and wish to secure by Letters Patent is:

An airplane propeller comprising in combination a propeller shaft, a hub carried by said shaft and having arms extending laterally therefrom, a socket bearing, a central bore, radially extending bearing openings and transverse and aligned tubular sockets provided in each of said arms, propeller blades carried by said arms, said propeller blades having ball portions on the inner ends thereof pivotally mounted in the socket bearings of said arms, laterally extending trunnions and longitudinal extensions on the ball portions of the blades, said trunnions being pivotally mounted in the bearing openings of said arms and said extensions projecting into the central bores thereof, and spring pressed plungers mounted in said tubular sockets of said arms and acting on said extensions of the ball portions of the blades for resisting and dampening any movement of said blades about their pivoted mounting.

WILLIAM C. OCKER.
GEORGE R. SMITH.